United States Patent
Kamiya

(10) Patent No.: US 9,251,242 B2
(45) Date of Patent: Feb. 2, 2016

(54) DATA RELATEDNESS ASSESSMENT DEVICE, DATA RELATEDNESS ASSESSMENT METHOD, AND RECORDING MEDIUM

(75) Inventor: Yuki Kamiya, Tokyo (JP)

(73) Assignee: NEC CORPORATION, Tokyo (JP)

(*) Notice: Subject to any disclaimer, the term of this patent is extended or adjusted under 35 U.S.C. 154(b) by 298 days.

(21) Appl. No.: 14/007,907

(22) PCT Filed: Mar. 30, 2012

(86) PCT No.: PCT/JP2012/058714
§ 371 (c)(1),
(2), (4) Date: Sep. 26, 2013

(87) PCT Pub. No.: WO2012/133841
PCT Pub. Date: Oct. 4, 2012

(65) Prior Publication Data
US 2014/0025697 A1   Jan. 23, 2014

(30) Foreign Application Priority Data
Mar. 30, 2011   (JP) ................... 2011-075877

(51) Int. Cl.
*G06F 17/30*   (2006.01)
*G06F 3/01*   (2006.01)

(52) U.S. Cl.
CPC ............ *G06F 17/30595* (2013.01); *G06F 3/01* (2013.01); *G06F 3/013* (2013.01); *G06F 17/30247* (2013.01)

(58) Field of Classification Search
CPC ........... G06F 3/013; G06F 3/01; G06F 3/017; G06F 17/30247
USPC ........................................................ 703/694
See application file for complete search history.

(56) References Cited

U.S. PATENT DOCUMENTS 5,583,795 A * 12/1996 Smyth .................. A61B 3/0025
359/630

2005/0120035 A1   6/2005   Karasudani et al.
(Continued)

FOREIGN PATENT DOCUMENTS

| JP | 10-11458 A | 1/1998 |
| JP | 2002-14999 A | 1/2002 |

(Continued)

OTHER PUBLICATIONS

Aya Fukasawa, "Identification of User's Interested Areas based on Eye Fixation Duration and BVP Height during Web Browsing", IEICE Technical Report, The Institute of Electronics, Information and Communication Engineers, Jan. 19, 2008, vol. 107, No. 462, pp. 1-6.

(Continued)

*Primary Examiner* — Thu-Nguyet Le

(57) ABSTRACT

Provided are a data relatedness assessment device, a data relatedness assessment method, and a recording medium that stores a program, which calculates relatedness between two or more pieces of data relevant to a task of a worker. A display area acquirer (13) acquires display area information that denotes respective display areas of two or more pieces of data displayed on the screen of a display (3). A line of sight information acquirer (11) acquires a line of sight position that is the position of the line of sight of a worker on the screen of the display (3). A gazing data generator (14) generates gazing data information that denotes data that the worker is gazing at based on the line of sight position and the display area information. An operation information acquirer (16) acquires operation information that denotes a content of an operation that the worker has executed on the displayed data. A data relatedness calculator (18) calculates mutual relatedness between the two or more pieces of data in the task of the worker according to a predetermined rule based on the gazing data information and the operation information.

11 Claims, 15 Drawing Sheets

(56) References Cited

U.S. PATENT DOCUMENTS

| | | |
|---|---|---|
| 2007/0088714 A1 | 4/2007 | Edwards et al. |
| 2010/0007601 A1 | 1/2010 | Lashina et al. |
| 2010/0328492 A1* | 12/2010 | Fedorovskaya ........ G06Q 30/02 348/231.2 |

FOREIGN PATENT DOCUMENTS

| | | |
|---|---|---|
| JP | 2002-238856 A | 8/2002 |
| JP | 2005-25550 A | 1/2005 |
| JP | 2007-212664 A | 8/2007 |
| JP | 2008-502990 A | 1/2008 |
| JP | 2009-003553 A | 1/2009 |
| JP | 2009-525529 A | 7/2009 |
| JP | 2010-79549 A | 4/2010 |
| JP | 2010-128916 A | 6/2010 |
| JP | 2010-271536 A | 12/2010 |
| WO | 2004/031956 A1 | 4/2004 |
| WO | 2005/124521 A1 | 12/2005 |
| WO | 2007/089198 A1 | 8/2007 |
| WO | 2007/132566 A1 | 11/2007 |

OTHER PUBLICATIONS

Noboru Nakamichi, "Empirical Study on Evaluating Web Usability with Eye Information", IPSJ SIG Notes, Jul. 17, 2003, vol. 2003, No. 73, pp. 1-8.

International Search Report for PCT Application No. PCT/JP2012/058714 mailed on Jun. 19, 2012.

The Extended European Search Report for EP Application No. EP12763517.5 dated Oct. 30, 2014.

Japanese Office Action for JP Application No. 2013-507823 mailed on Nov. 10, 2015 with English Translation.

* cited by examiner

Fig.4

| TIME | STARTING POINT | WINDOW SIZE | DISPLAY DATA | APPLICATION | DISPLAY ORDER |
|---|---|---|---|---|---|
| 2010/12/17 21:21:23 | (250,30) | (300,300) | DOCUMENT_X.doc | App A | 1 |
| 2010/12/17 21:21:23 | (10,250) | (300,300) | URL_Y.html | App B | 2 |
| 2010/12/17 21:21:24 | (250,30) | (300,300) | DOCUMENT_X.doc | App A | 2 |
| 2010/12/17 21:21:24 | (10,150) | (300,300) | URL_Y.html | App B | 1 |
| .. | .. | .. | .. | .. | .. |
| 2010/12/17 21:21:30 | (30,124) | (500,500) | URL_Z.html | App B | 1 |
| 2010/12/17 21:21:32 | (400,300) | (300,250) | IMAGE_P.bmp | App C | 1 |
| .. | .. | .. | .. | .. | .. |

T1

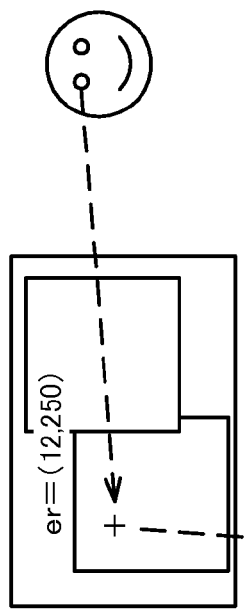
Fig.5A
Fig.5B
Fig.5C

Fig.6

| TIME | DATA GAZING TIME(SEC) | GAZING POINT | GAZING DATA | APPLICATION |
|---|---|---|---|---|
| 2010/12/17 21:21:23'46 | 25 | (13.5,247.5) | URL_Y.html | APP B |
| : | : | : | : | : |
| 2010/12/17 21:21:32'15 | 13 | (530,426) | IMAGE_P.bmp | APP C |
| : | : | : | : | : |

| TIME | APPLICATION | OPERATING DATA | OPERATION |
|---|---|---|---|
| 2010/12/17 21:21:23 | App A | DOCUMENT_X.doc | KEYBOARD INPUT [XX] (20bytes) |
| 2010/12/17 21:21:24 | App A | DOCUMENT_X.doc | KEYBOARD INPUT [What is...] (15bytes) |
| : | : | : | : |
| 2010/12/17 21:21:30 | App B | URL_Y.html | COPY (300bytes) |
| 2010/12/17 21:21:32 | App C | IMAGE_P.bmp | PASTE (300bytes) |
| : | : | : | : |

| START TIME | DATA GAZING TIME(SEC) | GAZING POINT | GAZING DATA |
|---|---|---|---|
| 2010/12/23 13:00:30 | 30 | x(250,227) | DOCUMENT_X.doc |
| 2010/12/23 13:01:01 | 5 | y(13,248) | URL_Y.html |
| 2010/12/23 13:01:06 | 24 | z(233,201) | DOCUMENT_X.doc |
| : | : | : | : |

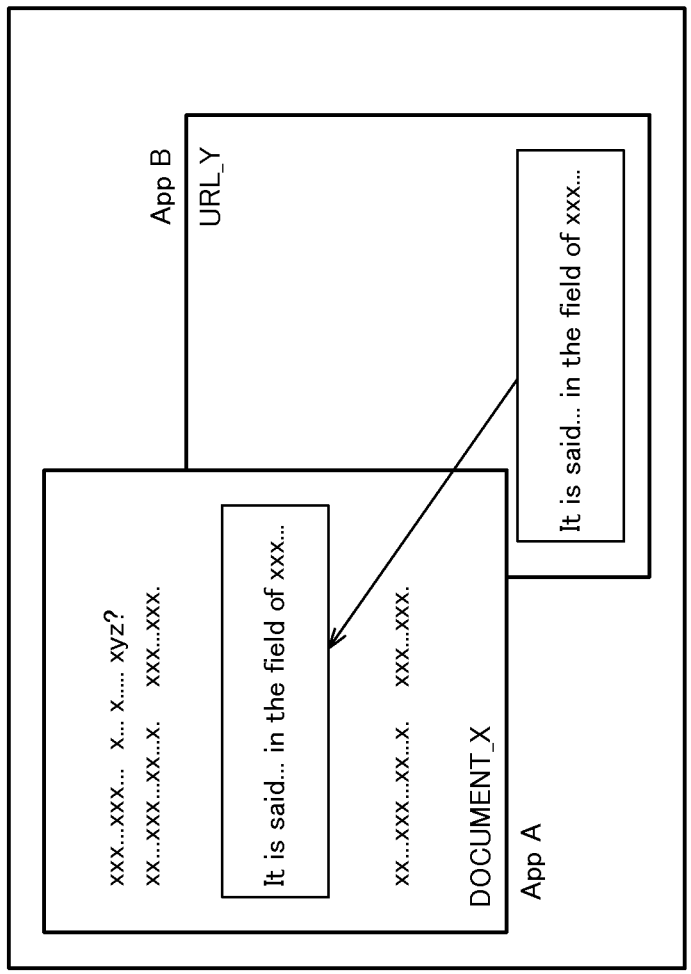

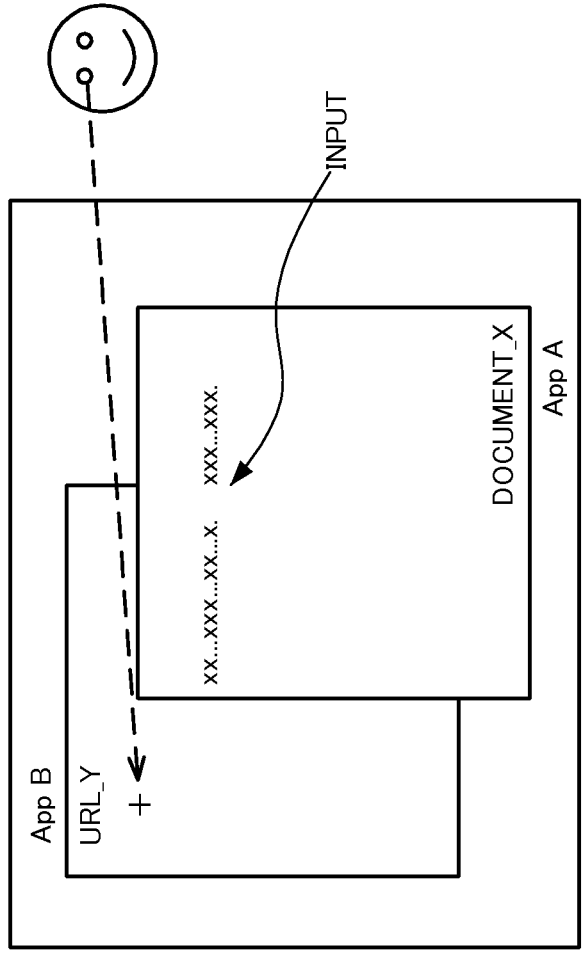

Fig.11

| RELATED DATA 1 | RELATED DATA 2 | RELATEDNESS R |
|---|---|---|
| URL_Y.html | DOCUMENT_X.doc | 0.3 |
| IMAGE_P.bmp | URL_Y.html | 0.11 |
| : | : | : |
| DOCUMENT_R.txt | SLIDE_Q.ppt | 0.5 |
| URL_S.html | URL_Z.html | 0.2 |
| : | : | : |

DATA RELATEDNESS ASSESSMENT DEVICE, DATA RELATEDNESS ASSESSMENT METHOD, AND RECORDING MEDIUM

This application is a National Stage Entry of PCT/JP2012/058714 filed Mar. 30, 2012, which claims priority from Japanese Patent Application 2011-075877 filed Mar. 30, 2011, the contents of all of which are incorporated herein by reference, in their entirety.

TECHNICAL FIELD

The present information relates to a data relatedness assessment device, a data relatedness assessment method, and a recording medium, which calculates relatedness between two or more pieces of data relevant to a business of a worker.

BACKGROUND ART

In businesses using computers, a worker often uses a plurality of applications simultaneously. In such a case, it is important to keep associating data, such as documents and images, with each other used in each application (including business data) with the business. This is because association of each business and data related to the business, for example, facilitates the worker to resume the business after once stopping the business.

Further, the data associated with the business is possibly utilized such as for assessing businesses similar to said business, extracting a file (data) that is considered necessary to carry out said business from data associated with the similar businesses, and thereby informing the worker of the file.

Patent Literatures 2, 4, and 5 disclose techniques for associating data with each other. Patent Literature 2 discloses a technique in which similarity of data is calculated based on keywords included in the data, and the data are associated with each other based on the similarity thereof. Patent Literature 4 discloses a technique in which data are associated with each other based on simultaneity of access time to the data. Patent Literature 5 discloses a technique in which copy and paste operations are detected on a computer, and data between the copy source and the copy destination are associated with each other.

Besides the techniques for associating data with each other, Patent Literatures 1, 3, 6, 7, and 8 disclose techniques that utilize line of sight information that denotes the line of sight of a user. The video playing device of Patent Literature 1 classifies a video or a video section to be played according to the degree of user's concentration on the video. Then, the video playing device selects a video or a video section to be played based on the classification result and the degree of user's concentration on the video. The liquid crystal display device of Patent Literature 3 computes the visual line angle of an audience with a television, and displays a video of image quality adjusted to the position of the audience. The work training system of Patent Literature 6 displays on a head-mounted display device the footage of a virtual vehicle and a virtual component that moves correspondingly to the movement of an operator.

Further, Patent Literature 7 discloses a technique of controlling a computer apparatus based on eye-tracking information. Patent Literature 8 discloses a technique of displaying feedback data on a display screen based on the absolute position of the gazing point of a user.

CITATION LIST

Patent Literature

Patent Literature 1: WO2007/132566
Patent Literature 2: Unexamined Japanese Patent Application Kokai Publication No. 2002-014999
Patent Literature 3: Unexamined Japanese Patent Application Kokai Publication No. 2007-212664
Patent Literature 4: Unexamined Japanese Patent Application Kokai Publication No. 2009-003553
Patent Literature 5: Unexamined Japanese Patent Application Kokai Publication No. 2010-128916
Patent Literature 6: Unexamined Japanese Patent Application Kokai Publication No. 2010-271536
Patent Literature 7: National Patent Publication No. 2008-502990
Patent Literature 8: National Patent Publication No. 2009-525529

SUMMARY OF INVENTION

Technical Problem

In Patent Literatures 4 and 5, relevance of data is assessed from operation information that denotes the content of an operation a worker has executed on a computer. However, operation information on a computer is not necessarily enough to assess relatedness of data involved in a task of a worker. For example, association of data does not occur when multiple application windows are superimposedly displayed on a display and data is input to a certain window while seeing data in another window.

Further, in Patent Literature 4, data are associated based on only the simultaneity of data access time. Therefore, all data that are open are associated even if part thereof is irrelevant. In Patent Literature 5, association of data does not occur when a copy operation and a paste operation are not accompanied.

In Patent Literature 2, data irrelevant to the operation of a worker are also associated with each other. However, data related to the same business but with different keywords are not associated with other.

The present invention was made in light of the circumstances as described above. It is an object of the invention to provide a data relatedness assessment device, a data relatedness assessment method, and a recording medium, which calculate relatedness between two or more pieces of data relevant to a task of a worker.

Solution to Problem

To achieve the above object, the data relatedness assessment device of a first aspect of the invention comprises: a display area acquirer that acquires information denoting respective display areas of two or more pieces of data displayed on a screen of a display device; a gazing data generator that acquires a line of sight position as a position of a line of sight of a worker on the screen of the display device, and generates gazing data information denoting the data that the worker is gazing at based on the acquired line of sight position and the information denoting the display area; an operation information acquirer that acquires operation information denoting a content of an operation that the worker has executed on the displayed data; and a relatedness calculator that calculates mutual relatedness of the two or more pieces of data in a task of the worker according to a predetermined rule based on the gazing data information and the operation information.

The data relatedness assessment method of a second aspect of the invention comprises the steps of: acquiring information denoting respective display areas of two or more pieces of data displayed on a screen of a display device; acquiring a line of sight position as a position of a line of sight of a worker on the screen of the display device; generating gazing data information denoting the data that the worker is gazing at based on the line of sight position and the information denoting the display area; acquiring operation information denoting a content of an operation that the worker has executed on the displayed data; and relatedness calculation calculating mutual relatedness of the two or more pieces of data in a task of the worker according to a predetermined rule based on the gazing data information and the operation information.

The computer-readable recording medium of a third aspect of the invention stores a program for causing a computer to perform the steps of: acquiring information denoting respective display areas of two or more pieces of data displayed on a screen of a display device; acquiring a line of sight position as a position of a line of sight of a worker on the screen of the display device; generating gazing data information denoting the data that the worker is gazing at based on the line of sight position and the information denoting the display area; acquiring operation information denoting a content of an operation that the worker has executed on the displayed data; and a relatedness calculation calculating mutual relatedness of the two or more pieces of data in a task of the worker according to a predetermined rule based on the gazing data information and the operation information.

Advantageous Effects of Invention

The present invention allows calculating relatedness of two or more pieces of data relevant to a task of a worker.

BRIEF DESCRIPTION OF DRAWINGS

FIG. 4 is a diagram showing an example of display data position information of the embodiment;

FIGS. 5A to 5C are diagrams showing an example of gazing information of the embodiment;

FIG. 6 is a diagram showing an example of gazing data information of the embodiment;

FIG. 7 is a diagram showing an example of the operation information of the embodiment;

FIGS. 9A and 9B are diagrams showing an example of calculating relatedness based on operations between data in the embodiment;

FIGS. 10A and 10B are diagrams showing an example of calculating data relatedness when an operation is executed on certain data while gazing another data in the embodiment;

FIG. 11 is a diagram showing an example of data relatedness that is ultimately output in the embodiment;

DESCRIPTION OF EMBODIMENTS

Figure 1:
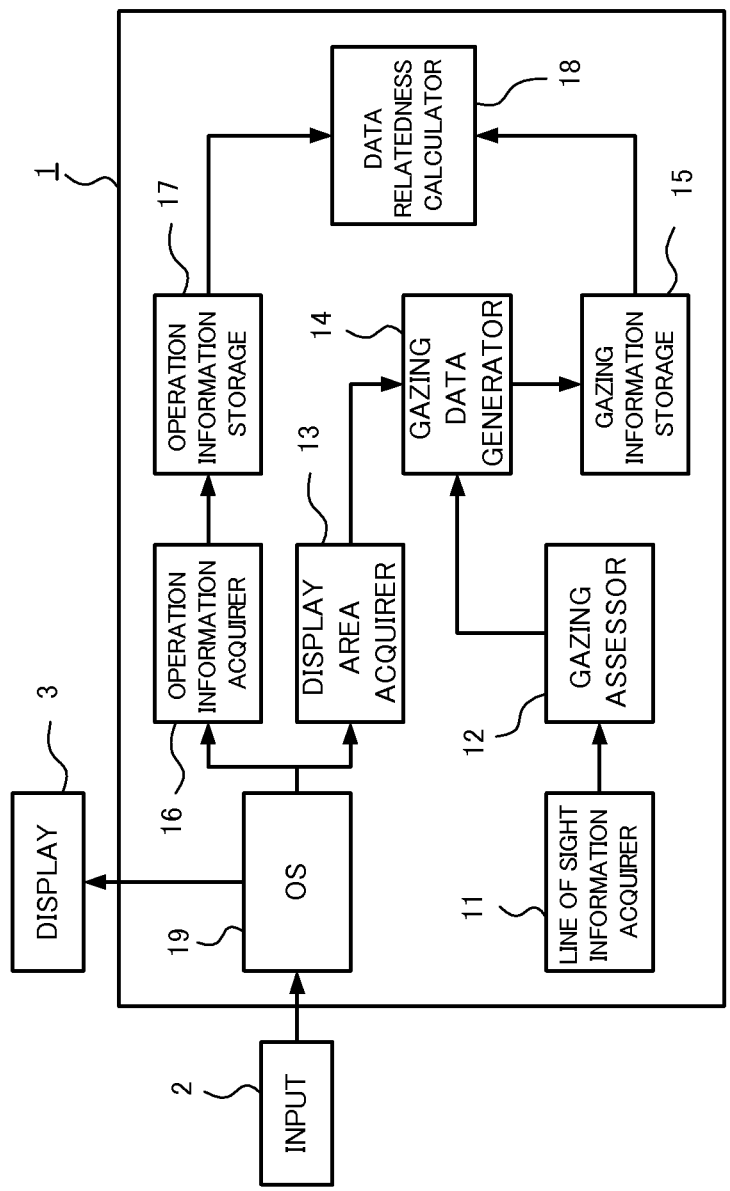
FIG. 1 is a block view showing a configuration example of the data relatedness assessment device according to the embodiment of the present invention.

With reference to the drawings, the following will describe the embodiment of the present invention in detail. It should be noted that the same or equivalent components in the drawings are affixed with the same reference signs.

FIG. 1 is a block view showing a configuration example of a system involving the data relatedness assessment device 1 according to the embodiment of the present invention. As shown in FIG. 1, the data relatedness assessment device 1 comprises a line of sight information acquirer 11, a gazing assessor 12, a display area acquirer 13, a gazing data generator 14, a gazing information storage 15, an operation information acquirer 16, an operation information storage 17, and a data relatedness calculator 18. The data relatedness assessment device 1 is realized, for example, by a computer with which a worker performs tasks such as browsing and editing data.

Figure 2:
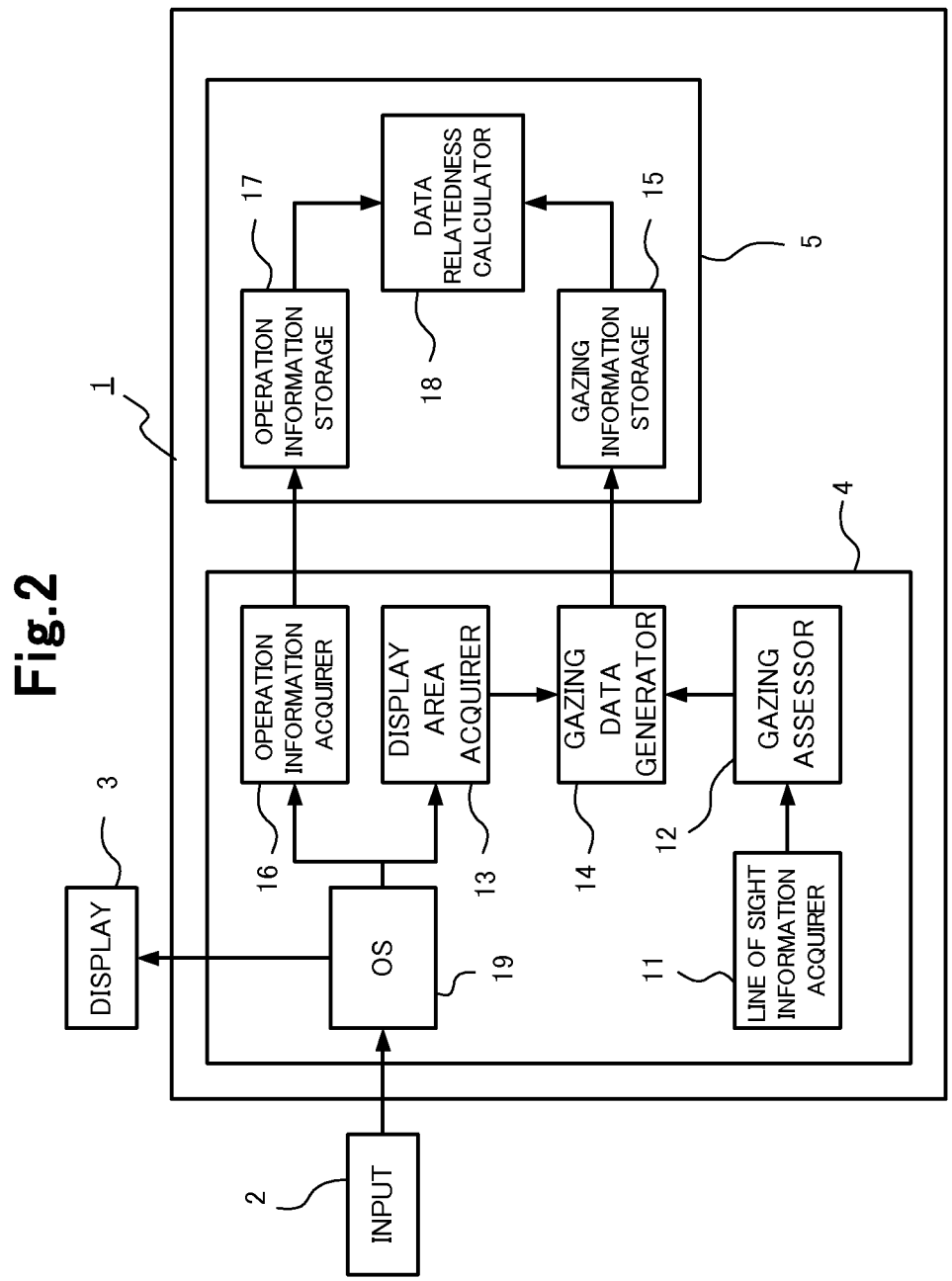
FIG. 2 is a block view showing an alternative configuration example of the data relatedness assessment device according to the embodiment.

FIG. 2 is a block view showing an alternative configuration example of a system involving the data relatedness assessment device 1 according to the embodiment. As shown in FIG. 2, the functional components of the data relatedness assessment device 1 are distributed between a terminal 4 and a server 5. In the data relatedness assessment device 1 shown in FIG. 2, the terminal 4 comprises a line of sight information acquirer 11, a gazing assessor 12, a display area acquirer 13, a gazing data generator 14, and an operation information acquirer 16. The server 5 comprises a gazing information storage 15, an operation information storage 17, and a data relatedness calculator 18.

Although not shown in FIG. 2, the terminal 4 and the server 5 communicate each other via a network. The operation information acquirer 16 of the terminal 4 transmits acquired operation information T5 (the details will be described hereinafter) to the server 5, and the server 5 stores the received operation information T5 to the operation information storage 17. Also, the gazing data generator 14 of the terminal 4 generates gazing information T3 (the details will be described hereinafter) that denotes data the worker is gazing at, transmits the generated gazing information T3 to the server 5, then, the server 5 stores the received gazing information T3 to the gazing information storage 15.

The data relatedness assessment device 1 is realized, in one case, by a single computer that a worker operates as shown in FIG. 1 or, in another case, by a terminal 4 and a server 5 as shown in FIG. 2. When the data relatedness assessment device 1 is realized by a terminal 4 and a server 5, the configuration of the functional components in the terminal 4 and the server 5 are not limited to the configuration shown in FIG. 2. For example, the server 5 possibly comprises the operation information acquirer 16 to acquire operation information T5 from the terminal 4.

Figure 3:
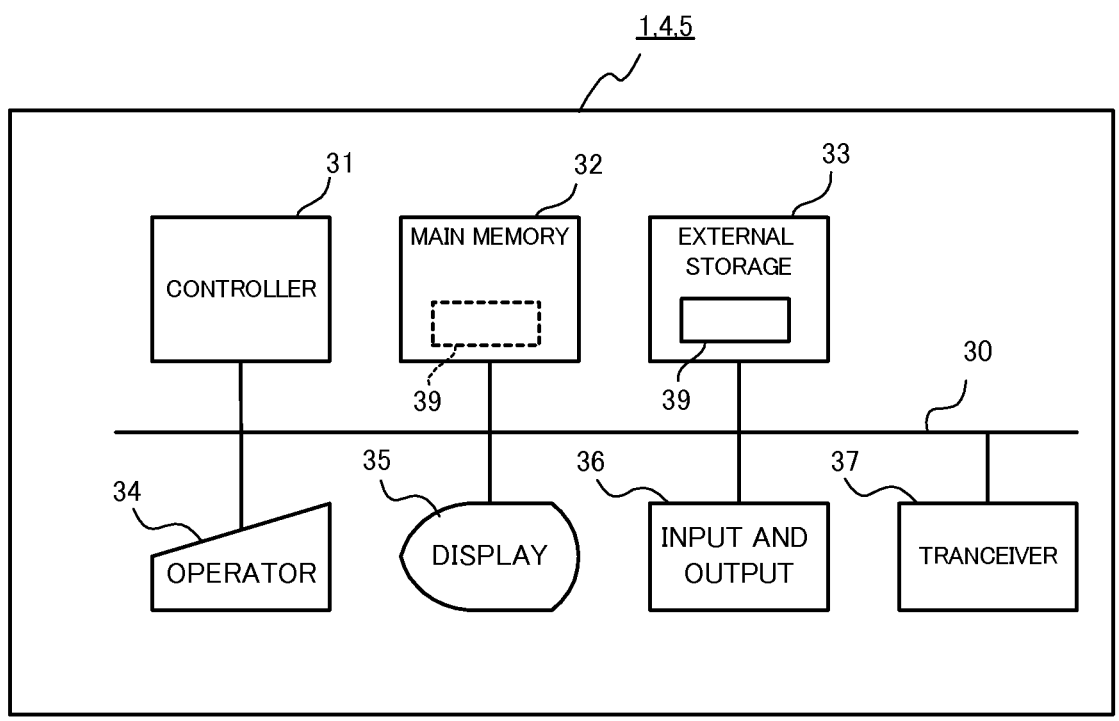
FIG. 3 is a block view showing a physical configuration example of the data relatedness assessment device according to the embodiment.

FIG. 3 is a block view showing a physical configuration example of a system involving the data relatedness assessment device 1 according to the embodiment. The configuration shown in FIG. 3 includes the data relatedness assessment device 1 of FIG. 1 or the terminal 4 and server 5 of FIG. 2.

As shown in FIG. 3, the system involving the data relatedness assessment device 1 comprises a controller 31, a main memory 32, an external storage 33, an operator 34, a display 35, an input and output 36, and a transceiver 37. The main memory 32, external storage 33, operator 34, display 35, input and output 36, and transceiver 37 are all connected to the controller 31 through an internal bus 30.

The controller 31 comprises a central processing unit (CPU) or the like, and carries out a series of processing of data relatedness assessment, which will be described hereinafter, in accordance with a control program 39 stored in the external storage 33.

The main memory 32 comprises a random-access memory (RAM) or the like, and loads the control program 39 stored in the external storage 33. The main memory 32 is used as a work area of the controller 31.

The external storage 33 comprises a non-volatile memory, such as a flash memory, a hard disk, a digital versatile disc random-access memory (DVD-RAM), a digital versatile disc rewritable (DVD-RW), or the like. The external storage 33 stores in advance the control program 39 for causing the controller 31 to carry out a series of processing of data relatedness assessment as will be described hereinafter. Also, the external storage 33, under the control of the controller 31, provides data included in this control program 39 to the controller 31, and stores data provided from the controller 31.

The operator 34 comprises a keyboard or a touch panel; a pointing device, such as a mouse and a touchpad; and an interface device which connects the keyboard or touch panel and the pointing device to the internal bus 30. The system including the data relatedness assessment device 1 accepts various types of operation instructions from a worker through the operator 34.

The display 35 comprises a liquid crystal display (LCD) or an organic electroluminescence (EL) display; and a speaker and the like, and displays data relevant to a task of a worker.

The input and output 36 comprises a serial interface or a parallel interface. A line of sight detection sensor 38 is connected to the input and output 36.

The transceiver 37 comprises a wireless transceiver, a wireless modem, or a network terminal device; and a serial interface or a local area network (LAN) interface that is connected therewith. When the data relatedness assessment device 1 comprises a terminal 4 and a server 5, the terminal 4 and the server 5 transmit and receive operation information T5, gazing information T3, and the like, via the transceiver 37.

The following will describe the configuration shown in FIG. 1.

Referring to FIG. 1, the input 2 corresponds to the operator 34, and the input 2 accepts instructions input by a worker. For example, the input 2 accepts input of instructions, such as selection of whole or part of the display area of data displayed on the screen, designation of a position to input data, selection of a pull-down menu or a pop-up menu, a command to the computer, and edit of data. The display 3 corresponds to the display 35, and displays, on the screen, data and the like to be used by a worker in a business. The operating system (OS) 19 controls reception of inputs at the input 2 and display of data on the display 3.

The data relatedness assessment device 1 comprises a line of sight acquirer 11, a gazing assessor 12, a display area acquirer 13, a gazing data generator 14, a gazing information storage 15, an operation information acquirer 16, an operation information storage 17, and a data relatedness calculator 18. These functional components are realized when the control program 39 uses the controller 31, main memory 32, external storage 33, operator 34, display 35, input and output 36, transceiver 37, and the like, as resources.

The line of sight information acquirer 11 comprises, for example, a camera that images a space on the side of a worker with respect to the screen of the display 3, and acquires information that denotes a position that the worker is gazing at on the screen of the display 3 (hereinafter, referred to as the line of sight position). More specifically, the line of sight information acquirer 11 detects the positions of the eyes of the worker (the position of a viewpoint) and the direction of the line of sight, and detects the point where the straight line drawn from the position of the viewpoint of the worker in the direction of the line of sight intersects with the screen of the display 3 as the line of sight position on the screen of the display 3.

The line of sight position is acquired, for example, using the line of sight detection sensor 38. As for the line of sight detection sensor 38, for example, Tobii X60 & X120 of Tobii Technology Japan, Ltd. is one option. Then, the line of sight information acquirer 11 generates line of sight position information T2 (FIG. 5B) that associates the acquired line of sight position with time when the line of sight position was acquired, and stores the line of sight position information T2 to the gazing information storage 15.

The line of sight position, which the line of sight information acquirer 11 acquires, is preferably expressed in a coordinate system, since, as will be described hereinafter, information denoting positions of the display areas of respective data that the display area acquirer 13 acquires, is expressed in a coordinate system. The line of sight information acquirer 11 converts the line of sight position, as necessary, into the same coordinate system as the position of the display area of data, after acquiring the line of sight position.

The display area acquirer 13 acquires display area information that denotes the position and range (the window size) of the display area of data displayed on the display 3. Information denoting the position of displayed data that the display area acquirer 13 acquires is information about the display position on the screen of each application window. The information may be any format as long as the application corresponding to each pixel on the screen is comprehensive. For example, if data is displayed in a rectangular window on the screen, the position and range of the display area of the data is expressed by the coordinates of the point on the upper left corner of the window (hereinafter, referred to as the starting point) and the horizontal and vertical length of the window. As the OS 19 is controlling displaying on the screen, the display area information is obtained by referring to data controlled by the OS 19.

Then, the display area acquirer 13 generates display data position information T1 that associates the acquired display area information, time when display of data corresponding to the display area information is started, the data corresponding to the display area information, a program (an application) for displaying the data, and display order denoting the order of the window that displays the data. The display data position information T1 is stored in the gazing information storage 15.

Here, FIG. 4 is a diagram showing an example of display data position information T1 of this embodiment. "TIME" of FIG. 4 denotes time when display of data is started. "TIME" also includes, as necessary, time when display of data ends (including temporal contraction). "STARTING PONT" is the coordinates, on the screen, at the point of the upper left corner of a window that displays data. "WINDOW SIZE" denotes horizontal and vertical length of the window. "DISPLAY DATA" denotes a name that uniquely identifies data displayed on the window. The types of displayed data include, for example, documents (texts, or hyper texts), slides, images, Web sites, and the like. "APPLICATION" is a name of a program for displaying data. In some cases, the same data is displayed by different applications. "DISPLAY ORDER" denotes the order of the window that displays data, and numbers are assigned to the windows from the window displayed in foreground. For example, referring to FIG. 4, DOCUMENT_X.doc and URL_Y.html are found to have been displayed on the screen at 21:21:23 (tt:mm:ss); and DOCUMENT_X.doc displayed in foreground. Also, DOCUMENT_X.doc and URL_Y.html are found to have been displayed on the screen at 21:21:24; and URL_Y in foreground. When a plurality of windows are overlapped with one another, and the gazing point, as will be described hereinafter, is positioned at a portion where the windows are overlapped, the gazing data generator 14, as will be described hereinafter, uses this "DISPLAY ORDER" for identifying data that the worker is gazing at.

Referring back to FIG. 1, the gazing assessor 12 extracts a gazing point that denotes a position that the worker is gazing at from the line of sight position information T2 generated by the line of sight information acquirer 11. Then, the gazing assessor 12 generates gazing information T3 that associates the extracted gazing point, time when a line of sight position corresponding to the gazing point was acquired, and gazing time denoting a time duration for gazing at the gazing point. Then, the gazing information T3 is stored in the gazing information storage 15.

Specifically, for example, gazing information T3 is generated by extracting a cluster by clustering points that combine the line of sight positions and the time, and associating the centroid of the extracted cluster (time and the line of sight position at the time) with gazing time calculated from the time corresponding to each point included in the extracted cluster. The gazing time is, more specifically, calculated by extracting the earliest time T1 and the latest time T2 among time corresponding to respective points included in the extracted cluster, and calculating a difference between T2 and T1—T2−T1—as gazing time. The point, included in the extracted cluster, used to form gazing information T3 is arbitrarily defined; for example, the point of which time is the earliest in the cluster is used as gazing information T3.

Also, the gazing assessor 12, for example, determines whether a line of sight position included in line of sight position information T2 is dwelling within a predetermined range over a certain time period (for example, five seconds or more) based on the line of sight position information T2, and extracts the line of sight position determined as dwelling within the predetermined range over the certain time period as a gazing point. Here, if a line of sight position is determined as dwelling within a predetermined range over a certain time period, the above-described assessment is not performed for other line of sight positions acquired by the line of sight information acquirer 11 while the line of sight position is dwelling within the predetermined range. It should be noted that a range where a line of sight position is dwelling is possibly extracted as a gazing range. Also, when the gazing assessor 12 assesses whether a line of sight position is dwelling within a predetermined range over a certain time period to extract a gazing point, dwell time during which the line of sight position is dwelling within the predetermined range is calculated as gazing time.

Also, when for example, a line of sight position is moving along a line at a certain speed, the gazing assessor 12 may extract the portion as a gazing portion. The speed at which the line of sight position moves can be calculated from a line of sight position and time when the line of sight position is acquired that are included in the line of sight position information T2.

Here, FIGS. 5A to 5C are diagrams showing an example of gazing information T3 of the embodiment. FIG. 5A schematically shows a line of sight position. The line of sight acquirer 11 intermittently acquires line of sight positions of a worker, and generates line of sight position information T2 as shown in FIG. 5B that associates the line of sight positions and time when the line of sight positions are acquired. The gazing assessor 12 extracts a gazing point that denotes a position where a worker is gazing from the line of sight position information T2. Then, the gazing assessor 12 generates gazing information T3 as shown in FIG. 5C that associates a gazing point with the time when a line of sight position corresponding to the gazing point was acquired and gazing time.

Referring back to FIG. 1, the gazing data generator 14 identifies data at which the worker is gazing (hereinafter, referred to as the gazing data) from the display data position information T1 generated by the display area acquirer 13 and gazing information T3 generated by the gazing assessor 12.

Specifically, for each gazing point included in gazing information T3, the gazing data generator 14 refers to time corresponding to the gazing point and display data position information T1 and identifies a data group displayed on the screen at the time. Then, the gazing data generator 14 identifies data that is displayed in a display area that includes the gazing point. When a plurality pieces of data are displayed in the display areas that include the gazing point, the gazing data generator 14 refers to "DISPLAY ORDER" included in the display data position information T1, and identifies the data with the least number of "DISPLAY ORDER" among the plurality pieces of data as the gazing data. Here, if necessary, the gazing data generator 14 further identifies which portion of the gazing data the worker is gazing at.

Then, the gazing data generator 14 generates gazing data information T4 that associates the identified gazing data and information including time when a line of sight position corresponding to the gazing point used for identifying the gazing data is acquired, and stores the gazing data information T4 to the gazing information storage 15.

Here, FIG. 6 is a diagram showing an example of gazing data information T4 of the embodiment. In the example of gazing data information T4 shown in FIG. 6, a gazing point, time when a line of sight position corresponding to the gazing point is acquired, gazing data identified from the gazing point, an application for displaying the gazing data, and data gazing time denoting time during which the gazing data is being gazed are associated as a set.

Referring back to FIG. 1, the operation information acquirer 16 acquires information that denotes the content of an operation, such as instructions or input, executed to the displayed data by a worker via the input 2. The input 2 and display 3 are controlled by the OS 19, which allows the operation information acquirer 16 to acquire the information denoting the content of the operation via the OS 19. Then, the operation information acquirer 16 generates operation information T5 which associates the acquired information denoting the content of the operation, operation data information denoting data that was a subject of the operation, information denoting a program (an application) for displaying the data, and time when the operation was executed, and stores the operation information T5 to the operation information storage 17.

Examples of information denoting the content of an operation that the operation information acquirer 16 acquires, include keyboard input information, mouse operation information, data access information, and application use information.

Here, FIG. 7 is a diagram showing an example of operation information T5 of the embodiment. In the example of FIG. 7, time when the worker operated, an application for displaying the operating data, data that is a subject of the operation, the content of the operation, are associated and stored. Further, when the operation is copying (or pasting), the operation content includes, for example, the copied (or pasted) data amount. Further, when the operation is data input, the operation content includes, for example, the input data amount.

Referring back to FIG. 1, the data relatedness calculator 18 calculates relatedness between two or more pieces of data displayed on the screen of the display 3, based on operation information T5 and gazing data information T4 that are respectively accumulated in the operation information storage 17 and the gazing information storage 15. The data relatedness calculator 18 arbitrary determines timing to calculate relatedness between data. For example, calculation of data relatedness is automatically executed at a certain time interval, or executed at timing designated by a worker. Further, for example, when a worker finished browsing or editing certain data and closed the file of the data, relatedness between data that had been displayed is calculated based on the operation information T5 and the gazing data information T4 that have accumulated until then.

The data relatedness calculator 18 refers to gazing data information T4, and calculates mutual relatedness between data based on dwell time during which a line of sight position dwells within a display area of each data (data gazing time), and the way how the line of sight position moves from the display area of certain data to the display area of another data. For example, when a line of sight position moves from the display area of one piece of data X to the display area of another piece of data Y, and comes back to the display area of the data X, relatedness between the two pieces of data X, Y is defined by the following formula e (X, Y): e (X, Y)=log (gazing time of Y)*exp {−(a sum of time during which the gazing point moves from X to Y and time during which the gazing point moves from Y to X)}*exp {−(a difference between a line of sight position at X before the line of sight position X moves from X to Y and a line of sight position X after the line of sight position comes back from Y to X)}.

Figures 8A, 8B:
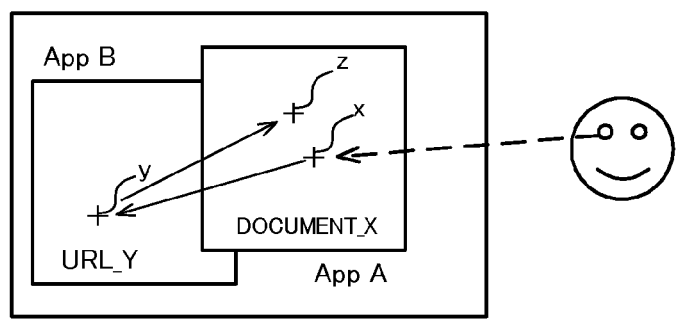
FIGS. 8A and 8B are diagrams showing an example of calculating data relatedness based on the movement of the line of sight position between data in the embodiment.

Here, FIGS. 8A and 8B are diagrams showing an example of calculating data relatedness from the movement of a line of sight position between data in the embodiment. FIG. 8A schematically shows the movement of a line of sight position. In the example of FIG. 8A, the line of sight position moves from a point x in the display area of DOCUMENT_X to a point y in the display area of URL_Y, and comes back to a point z in the display area of DOCUMENT_X. FIG. 8B expresses the example shown in FIG. 8A as gazing data information T4.

Assigning the gazing data information shown in FIG. 8B to the above formula e(X, Y), we have: e (X, Y)=log(5)*exp (−(1+0))*exp(−√((250−233)2+(227−201)2)). It should be noted that when the data at the line of the sight position before and after moving the line of the sight position are the same, this association processing will not be carried out.

Further, when a copy operation and a paste operation are executed between two pieces of data, the data relatedness calculator 18 calculates relatedness between the data using the copied and pasted data amount. For example, when a worker copies from one piece of data Y and pastes to another piece of data X, relatedness between the one piece of data X and the other piece of data Y is calculated by the rate of the copied and pasted data amount to the data amount of the one piece of data Y and/or the data amount of the other piece of data X. Relatedness between the one piece of data X and the other piece of data Y is defined, for example, by the following formula p (X, Y): p(X, Y)=(the amount of data copied from Y and pasted to X)/(the data amount of X).

Here, FIGS. 9A and 9B are diagrams showing an example of calculating relatedness based on operations executed between data in this embodiment. FIG. 9A shows a case in which part of URL_Y is copied and pasted to DOCUMENT_X. FIG. 9B shows information that the data relatedness calculator 18 extracts from operation information T5 to calculate relatedness in the case of FIG. 9A. If the data amount of DOCUMENT_X is 5,000 bytes and assigned to the formula p(X, Y), we have: p(X, Y)=30/5,000. Another option is to define p(X, Y) as follows: p(X, Y)=(the amount of data copied from Y and pasted to X)/(the data amount of Y).

Further, the data relatedness calculator 18 calculates relatedness of data from gazing time during which one piece of data is being gazed at and the data amount input to another piece of data while gazing at the one piece of data. For example, using dwell time during which a line of sight position is dwelling within the display area of one piece of data Y, and the data amount input to another piece of data X while the line of sight position is dwelling within the display area of the one piece of data Y, relatedness of the one piece of data Y and the other piece of data X is defined by the following formula r(X, Y): r(X, Y)=log(gazing time of Y)*log(the amount of data input to X while gazing at Y).

Here, FIGS. 10A and 10B are diagrams showing an example of calculating data relatedness when an operation is executed to other data while gazing at certain data in this embodiment. FIG. 10A shows that a worker is inputting into DOCUMENT_X while gazing at URL_Y. FIG. 10B shows information that the data relatedness calculator 18 extracted from gazing data information T4 and operation information T5 for calculating relatedness in the case of FIG. 10A. The fact that the worker is inputting into DOCUMENT_X while gazing at URL_Y is determined from time and data gazing time included in gazing data information T4 and operation information T5. If the example shown in FIG. 10B is assigned to r(X, Y), r (X, Y)=log(30)*log(80) is obtained.

Further, the data relatedness calculator 18 combines e(X, Y), p(X, Y), and r(X, Y) to calculate relatedness between data X and data Y. Specifically, for example, e(X, Y), p(X, Y), and r(X, Y) are added for all gazing data information T4 and operation information T5, and the weight average is defined as relatedness R of data X and Y. In such a case, relatedness R is expressed by following Equation 1:

$$R(X, Y) = \frac{\sum e(X, Y) + \sum p(X, Y) + \sum r(X, Y)}{3} \quad [\text{Equation 1}]$$

Here, FIG. 11 is a diagram showing an example of data relatedness to be finally output in this embodiment. Each row of FIG. 11 shows relatedness R of related data 1 and related data 2. For example, the first row denotes relatedness R of URL_Y and DOCUMENT_X, where the relatedness R is 0.3.

Figure 12:
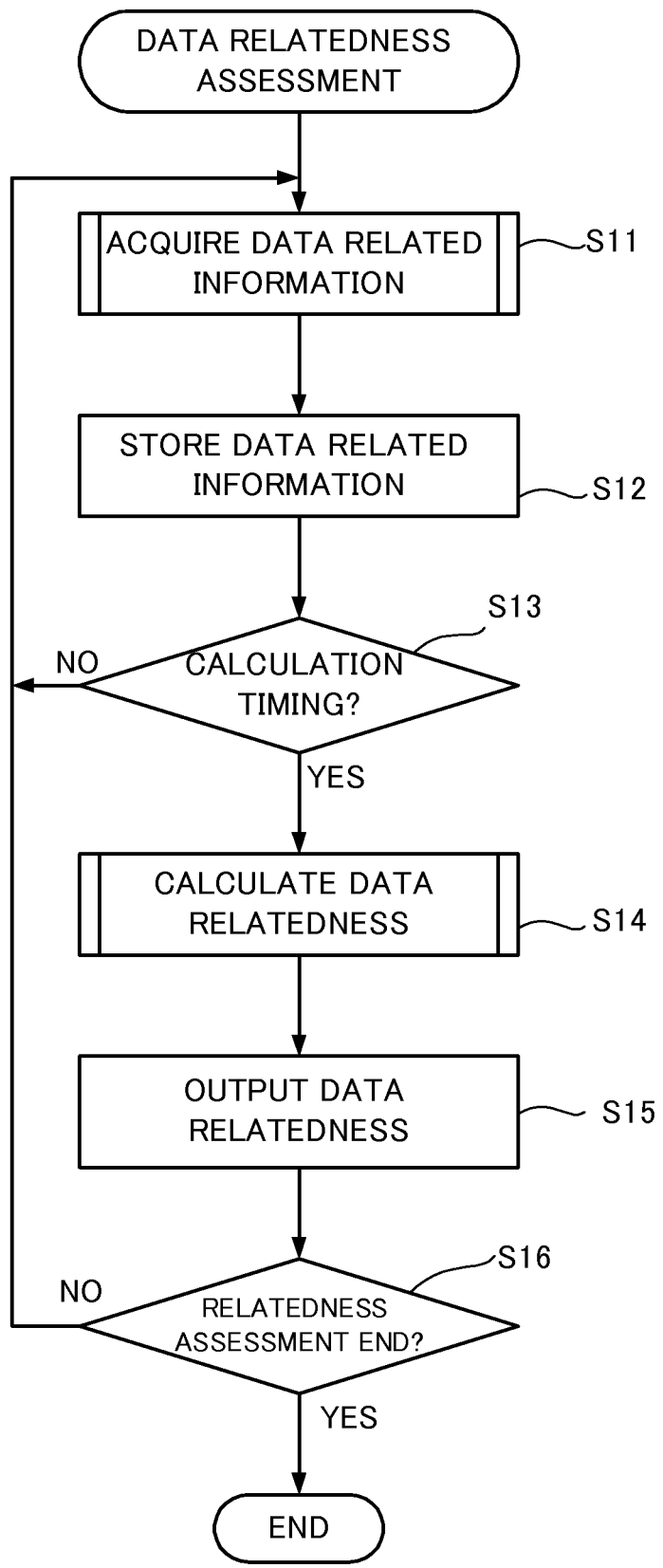
FIG. 12 is a flowchart showing an example of a behavior of data relatedness assessment in the embodiment.

Next, FIG. 12 is a flowchart showing an example of the behavior of data relatedness assessment in this embodiment. The series of processing of this behavior is started, for example, when a worker turns ON the data relatedness assessment function. The data relatedness assessment device 1 starts acquiring gazing data information T4 and operation information T5 (together, referred to as the data related information) (Step S11). Then, the acquired data related information is stored (Step S12). Specifically, the acquired gazing data information T4 is stored in the gazing information storage 15, and the acquired operation information T5 is stored in the operation information storage 17.

Then, whether it is the timing to calculate data relatedness is determined (Step S13). If it is determined as not the timing to calculate data relatedness (Step S13; NO), the processing goes back to step S11, and the above processing is repeated. On the contrary, if it is determined as the timing to calculate data relatedness (Step S13; YES), the data relatedness calculator 18 calculates data relatedness R (Step S14).

Then, the data relatedness calculator 18 outputs the calculated data relatedness R (Step S15). Then, whether termination of processing of data relatedness assessment is instructed or not is determined (Step S16). If termination of processing of data relatedness assessment is determined as not instructed (Step S16; NO), the processing goes back to step S11, and the above processing is repeated. On the contrary, if termination of data relatedness assessment is determined as instructed (Step S16; YES), the processing of the data relatedness assessment terminates. Here, the instruction of termination of data relatedness assessment refers to, for example, a case in which a worker turns OFF the data relatedness assessment function.

Figure 13:
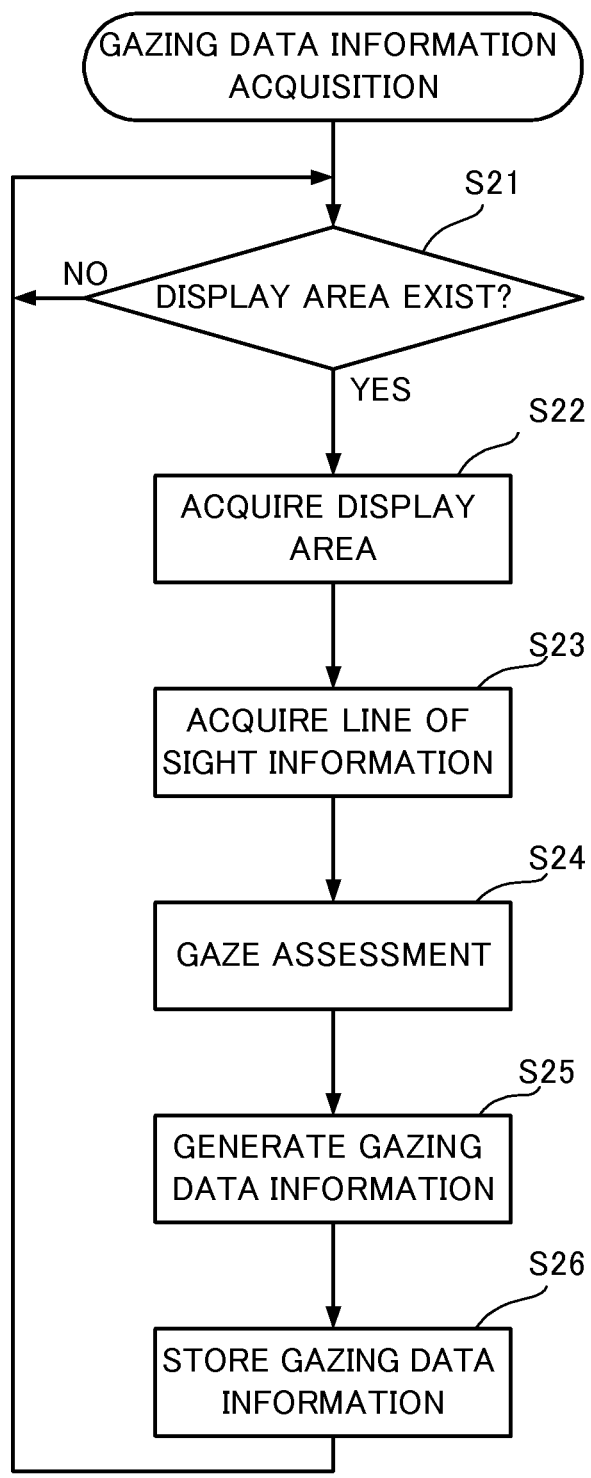
FIG. 13 is a flowchart showing an example of a behavior of gazing data information acquisition.

Next, FIG. 13 is a flowchart showing an example of the behavior of acquiring gazing data information. This processing for acquiring gazing data information T4 is part of the processing of steps S11 and S12 of FIG. 12. The display area acquirer 13 determines whether data is displayed on the screen of the display 3 or not (Step S21). If the screen of the display 3 is determined as not displaying data (Step S21; NO), the processing of step S21 is repeated and data is awaited to be displayed on the screen of the display 3. On the contrary, if the screen of the display 3 is determined as displaying data (Step S21; YES), the display area acquirer 13 acquires the display area information of the data (Step S22).

The line of sight information acquirer 11 acquires the line of sight position of the worker on the screen of the display 3 and present time, associates the acquired line of sight position and the time, and outputs as line of sight position information T2 (Step S23). The gazing assessor 12 determines whether the worker is gazing at the line of sight position included in the line of sight position information T2 based on the line of sight position information T2, then, generates gazing information T3 that associates gazing point that denotes the line of sight position that has been determined as being gazed at; time when the line of sight position is acquired, and gazing time (Step S24).

Then, the gazing data generator 14 determines data that the worker is gazing at from the display area information acquired by the display area acquirer 13 and the gazing information T3 generated by the gazing assessor 12. Then, the gazing data generator 14 generates gazing data information T4 that associates gazing data denoting data that has been determined as being gazed at, a program (an application) for displaying the gazing data, data gazing time denoting time for gazing the gazing data, and gazing information T3 corresponding to the gazing data (step S25). The gazing data generator 14 stores the generated gazing data information T4 to the gazing information storage 15 (Step S26). The data relatedness assessment device 1 repeats the series of processing.

Figure 14:
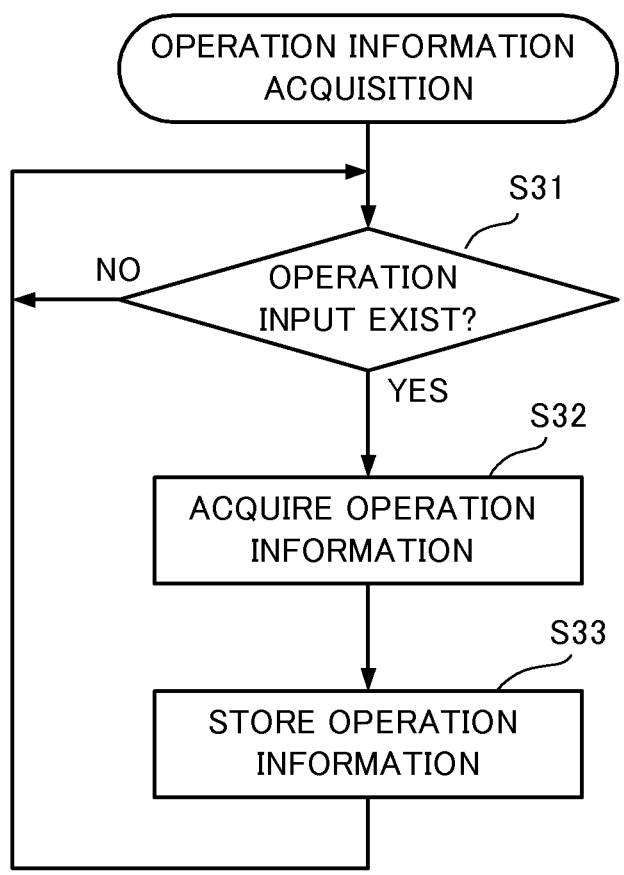
FIG. 14 is a flowchart showing an example of a behavior of operation information acquisition.

Next, FIG. 14 is a flowchart showing an example of the behavior of operation information acquisition. This processing for acquiring operation information T5 is a part of processing of steps S11 and S12 of FIG. 12. The operation information acquirer 16 determines whether the worker has input an operation via the input 2 or not (Step S31). If it is determined that no operation has been input (Step S31; NO), the operation information acquirer 16 repeats the processing of step S31, and awaits input of an operation from the worker. On the contrary, if it is determined that an operation has been input (Step S31; YES), the operation information acquirer 16 acquires the operation information T5 via the OS19 (Step S32). The operation information acquirer 16 stores the acquired operation information T5 to the operation information storage 17 (Step S33). The data relatedness assessment device 1 repeats the series of processing.

It should be noted that the behavior of gazing data information acquisition shown in FIG. 13 and the behavior of operation information acquisition shown in FIG. 14 are performed independently yet in parallel.

Figure 15:
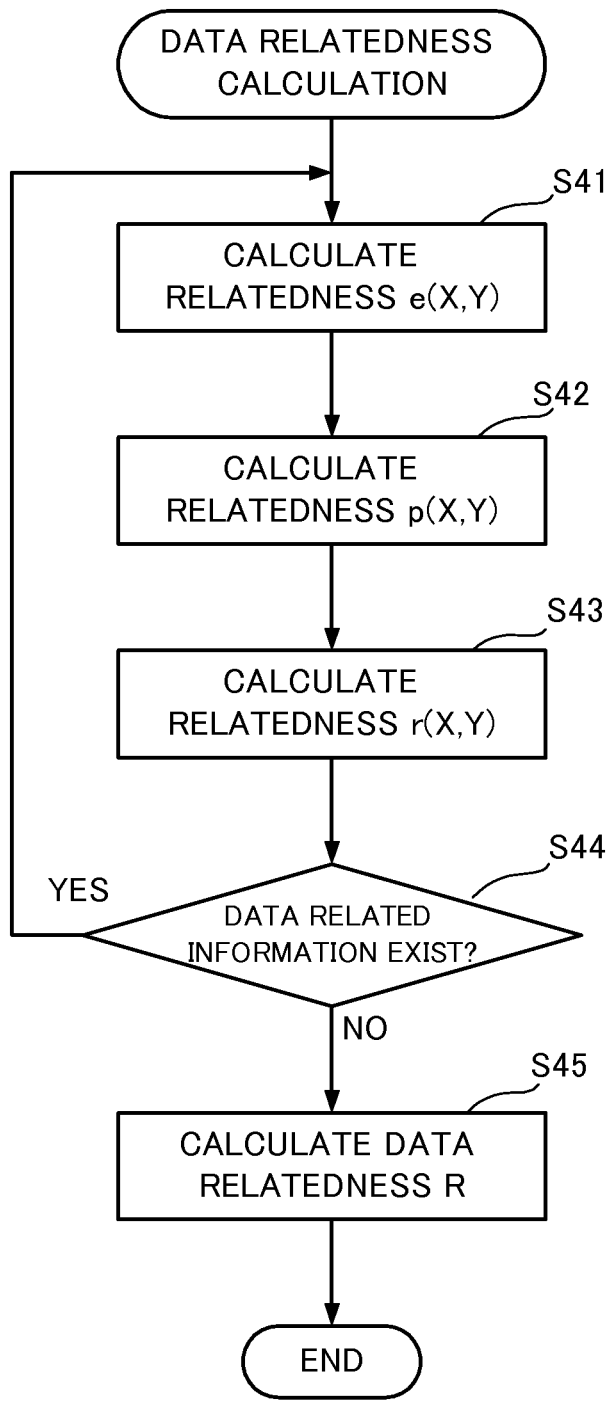
FIG. 15 is a flowchart showing an example of a behavior of data relatedness calculation in the embodiment.

Next, FIG. 15 shows a flowchart showing an example of the behavior of calculating data relatedness in this embodiment. The processing of calculating data relatedness shown in FIG. 15 corresponds to the processing of step S14 of FIG. 12. The data relatedness calculator 18 calculates data relatedness e(X, Y) from gazing data information T4 generated by the gazing data generator 14 and stored in the gazing information storage 15 (Step S41). Then, the data relatedness calculator 18 calculates data relatedness p(X, Y) from operation information T5 acquired by the operation information acquirer 16 and stored in the operation information storage 17 (Step S42). Then, the data relatedness calculator 18 calculates data relatedness r(X, Y) from the gazing data information T4 and operation information T5 (Step S43).

Then, the data relatedness calculator 18 determines whether or not there is data related information of which data relatedness calculation processing has not performed (Step S44). If it is determined that there is data related information of which data relatedness calculation processing has not yet been performed (Step S44; YES), processing of steps S41 to S43 are performed to the data related information. It should be noted that the processing of steps S41 to S43 is possibly executed in parallel.

On the contrary, if it is determined that there is no data related information of which data relatedness calculation processing has not performed (Step S44; NO), for example, data relatedness R is calculated according to the formula denoted by Equation 1 (Step S45), then the processing of the data relatedness calculation terminates.

The data relatedness assessment device 1 of the embodiment enables calculating relatedness among two or more pieces of data relevant to the business (data) of a worker. Thus, data relevant to the business can be appropriately provided as a course of a business support upon checking the business data, resuming the business, comparing the procedure with that of other similar businesses, and in other occasions.

Also, the data relatedness assessment device 1 of the embodiment enables associating data related to the content of the business the worker is engaging in with the business the worker is engaging in. As for the unit of data for association, there are considered, for example, association in a unit of file, association in a unit of paragraph, association between a paragraph and a file, association in a unit of image, association in a unit of figure, association between a figure and a file.

In the embodiment, the related information that denotes relevance of data output by the data relatedness calculator 18 is information, as shown in FIG. 11, denoting a related data pair and the relatedness of the related data pair. However, without limitation to this, for example, related information possibly include time when relatedness of a data pair was calculated. Also, the specific content of the information denoting the relatedness (relevance) of a data pair possibly varies according to the purpose of use, including, for example, behavior information of a worker that denotes relatedness between data, such as a group of data that a worker is gazed at during a task, and gazing data and operating data, and the value of relatedness calculated from time and count of related behaviors between data.

As for the operation information T5 of the embodiment, the operation information T5 possibly includes information denoting the content of operating data when the operation is a copy operation, a paste operation, and the like, as well as when the operation is an input operation. In this way, when an operation that influences data relatedness, such as deleting pasted data, is executed after the data relatedness has calculated, the original data of the deleted data in the copy source is identified to recalculate relatedness with the identified data, which allows appropriate assessment of data relatedness on a constant basis.

The hardware configurations and flowcharts shown in this embodiment are only examples, which are subject to alteration and adjustment as necessary. That is, the scope of the invention is not represented by the embodiment but represented by the scope of the appended claims. Further, any variants made within the scope of the claims and the spirit of inventions equivalent thereto are considered to fall within the scope of the present invention.

Each function of the data relatedness assessment device 1 is realizable by a general computer system without a dedicated system. For example, a computer program for performing the behaviors of data relatedness assessment of the embodiment is stored in a computer-readable recording medium (a flexible disk, CD-ROM, DVD-ROM, or the like) and distributed. Then, by installing the computer program into a computer, the data relatedness assessment device 1 that performs the above-described processing is configured. Alternatively, a computer system possibly downloads the computer program stored in the storage device of a server device over a communication network such as the Internet to configure the data relatedness assessment device 1.

Further, to realize each function of the data relatedness assessment device 1 by sharing burdens between the operating system (OS) and the application program, or cooperation thereof, only the application program is stored in the recording medium or a storage device.

Further, the computer program is possibly superimposed on a carrier wave to be distributed via a communication network. For example, the computer program is posted on a board (BBS: Bulletin Board System) on a communication network and the computer program is distributed through the network. Then, the functions of the data relatedness assessment device 1 are realized by executing the computer program.

Part or whole of the above described embodiment is described as the following supplementary notes, while not limited to the following.

(Supplementary Note 1)

A data relatedness assessment device comprising: a display area acquirer that acquires information denoting respective display areas of two or more pieces of data displayed on a screen of a display device; a gazing data generator that acquires a line of sight position as a position of a line of sight of a worker on the screen of the display device, and generates gazing data information denoting the data that the worker is gazing at based on the acquired line of sight position and the information denoting the display area; an operation information acquirer that acquires operation information denoting a content of an operation that the worker has executed on the displayed data; and a relatedness calculator that calculates mutual relatedness of the two or more pieces of data in a task of the worker according to a predetermined rule based on the gazing data information and the operation information.

(Supplementary Note 2)

The data relatedness assessment device according to Supplementary Note 1, wherein the relatedness calculator calculates mutual relatedness of two pieces of data based on: dwell time during which the line of sight position is dwelling within respective display areas of the two pieces of data included in the two or more pieces of data; time required for the line of sight position to move between the display areas of the two pieces of data; and a difference between the line of sight position before the line of sight position moves from the display area of one piece of data of the two pieces of data to the display area of the other piece of data and the line of sight position after the line of sight position moves back from the display area of the other piece of data to the display area of the one piece of data.

(Supplementary Note 3)

The data relatedness assessment device according to either Supplementary Note 1 or 2, wherein when the worker copies from one piece of data of the two or more pieces of data and pastes on another piece of data, the relatedness calculator calculates relatedness between the one piece of data and the other piece of data based on a rate of a data amount of the copied and pasted data to a data amount of the one piece of data and/or a data amount of the other piece of data.

(Supplementary Note 4)

The data relatedness assessment device according to any one of Supplementary Notes 1 to 3, wherein the relatedness calculator calculates relatedness between one piece of data and another piece of data based on dwell time during which the line of sight position is dwelling within the display area of the one piece of data of the two or more pieces of data, and a data amount input by the worker to the other piece of data of the two or more pieces of data while the line of sight position is dwelling within the display area of the one piece of data.

(Supplementary Note 5)

The data relatedness assessment device according to Supplementary Note 1, wherein the relatedness calculator calculates mutual relatedness of two pieces of data included in the two or more pieces of data by using a weighted average of: relatedness of the two pieces of data that is calculated based on: dwell time during which the line of sight position is dwelling within respective display areas of the two pieces of data; time required for the line of sight position to move between the display areas of the two pieces of data; and a difference between the line of sight position before the line of sight position moves from the display area of one piece of data of the two pieces of data to the display area of the other piece of data thereof and the line of sight position after the line of sight position moves back from the display area of the other piece of data to the display area of the one piece of data; relatedness of the two pieces of data that is calculated based on, when the worker copies from the one piece of data of the two pieces of data and pastes on the other piece of data thereof, a rate of a data amount of the copied and pasted data to a data amount of the one piece of data and/or a data amount of the other piece of data; and relatedness of the two pieces of data that is calculated based on dwell time during which the line of sight position is dwelling within the display area of the one piece of data of the two pieces of data, and a data amount input by the worker to the other piece of data thereof while the line of sight position is dwelling within the display area of the one piece of data.

(Supplementary Note 6)

A data relatedness assessment method comprising the steps of: acquiring information denoting respective display areas of two or more pieces of data displayed on a screen of a display device; acquiring a line of sight position as a position of a line of sight of a worker on the screen of the display device; generating gazing data information denoting the data that the worker is gazing at based on the line of sight position and the information denoting the display area; acquiring operation information denoting a content of an operation that the worker has executed on the displayed data; and a relatedness calculation calculating mutual relatedness of the two or more pieces of data in a task of the worker according to a predetermined rule based on the gazing data information and the operation information.

(Supplementary Note 7)

The data relatedness assessment method according to Supplementary Note 6, wherein the relatedness calculation step calculates mutual relatedness of two pieces of data based on: dwell time during which the line of sight position is dwelling within respective display areas of the two pieces of data included in the two or more pieces of data; time required for the line of sight position to move between the display areas of the two pieces of data; and a difference between the line of sight position before the line of sight position moves from the display area of one piece of data of the two pieces of data to the display area of the other piece of data and the line of sight position after the line of sight position moves back from the display area of the other piece of data to the display area of the one piece of data.

(Supplementary Note 8)

The data relatedness assessment method according to either Supplementary Note 6 or 7, wherein when the worker copies from one piece of data of the two or more pieces of data and pastes on another piece of data, the relatedness calculation step calculates relatedness between the one piece of data and the other piece of data based on a rate of a data amount of the copied and pasted data to a data amount of the one piece of data and/or a data amount of the other piece of data.

(Supplementary Note 9)

The data relatedness assessment method according to any one of claims 6 to 8, wherein the relatedness calculation step calculates relatedness between one piece of data and another piece of data based on dwell time during which the line of sight position is dwelling within the display area of the one piece of data of the two or more pieces of data, and a data amount input by the worker to the other piece of data of the two or more pieces of data while the line of sight position is dwelling within the display area of the one piece of data.

(Supplementary Note 10)

The data relatedness assessment method according to Supplementary Note 6, wherein the relatedness calculation step calculates mutual relatedness of two pieces of data included in the two or more pieces data by using a weighted average of: relatedness of the two pieces of data that is calculated based on: dwell time during which the line of sight position is dwelling within respective display areas of the two pieces of data; time required for the line of sight position to move between the display areas of the two pieces of data; and a difference between the line of sight position before the line of sight position moves from the display area of one piece of data of the two pieces of data to the display area of the other piece of data thereof and the line of sight position after the line of sight position moves back from the display area of the other piece of data to the display area of the one piece of data; relatedness of the two pieces of data that is calculated based on, when the worker copies from the one piece of data of the two pieces of data and pastes on the other piece of data thereof, a rate of a data amount of the copied and pasted data to a data amount of the one piece of data and/or a data amount of the other piece of data; and relatedness of the two pieces of data that is calculated based on dwell time during which the line of sight position is dwelling within the display area of the one piece of data of the two pieces of data, and a data amount input by the worker to the other piece of data thereof while the line of sight position is dwelling within the display area of the one piece of data.

(Supplementary Note 11)

A computer-readable recording medium that stores a program for causing a computer to perform the steps of: acquiring information denoting respective display areas of two or more pieces of data displayed on a screen of a display device; acquiring a line of sight position as a position of a line of sight of a worker on the screen of the display device; generating gazing data information denoting the data that the worker is gazing at based on the line of sight position and the information denoting the display area; acquiring operation information denoting a content of an operation that the worker has executed on the displayed data; and a relatedness calculation calculating mutual relatedness of the two or more pieces of data in a task of the worker according to a predetermined rule based on the gazing data information and the operation information.

It should be noted that the present application is based on Japanese Patent Application No. 2011-075877, filed as of Mar. 30, 2011. The whole descriptions, claims, and drawings of Japanese Patent Application No. 2011-075877 are incorporated herein by reference.

INDUSTRIAL APPLICABILITY

In improvement of business efficiency and a business process management support, the present invention is expected to enhance efficiency of tasks by appropriately providing data related to the business upon resuming the business. Further, the present invention is utilized for sharing information of tasks of workers within a company and comparing data related to tasks that the workers are performing and data related to similar businesses, whereby a process lacking in the business is informed and data used by other workers who have performed similar businesses is provided to the working data.

REFERENCE SIGNS LIST

1 Data relatedness assessment device
2 Input
3 Display
4 Terminal
5 Server
11 Line of sight information acquirer
12 Gazing assessor
13 Display area acquirer
14 Gazing data generator
15 Gazing information storage
16 Operation information acquirer
17 Operation information storage
18 Data relatedness calculator
19 Operating system (OS)
30 Internal bus
31 Controller
32 Main memory
33 External storage
34 Operator
35 Display 36 Input and output
37 Transceiver
38 Line of sight detection sensor
39 Control program

What is claimed is:

1. A data relatedness assessment device comprising:
a display area acquirer that acquires information denoting respective display areas of two or more pieces of data displayed on a screen of a display device;
a gazing data generator that acquires a line of sight position as a position of a line of sight of a worker on the screen of the display device, and generates gazing data information denoting the data that the worker is gazing at based on the acquired line of sight position and the information denoting the display area;
an operation information acquirer that acquires operation information denoting a content of an operation that the worker has executed on the displayed data; and
a relatedness calculator that calculates mutual relatedness of the two or more pieces of data in a task of the worker according to a predetermined rule based on the gazing data information and the operation information.

2. The data relatedness assessment device according to claim 1, wherein
the relatedness calculator calculates mutual relatedness of two pieces of data based on: dwell time during which the line of sight position is dwelling within respective display areas of the two pieces of data included in the two or more pieces data; time required for the line of sight position to move between the display areas of the two pieces of data; and a difference between the line of sight position before the line of sight position moves from the display area of one piece of data of the two pieces of data to the display area of the other piece of data and the line of sight position after the line of sight position moves back from the display area of the other piece of data to the display area of the one piece of data.

3. The data relatedness assessment device according to claim 1, wherein
when the worker copies from one piece of data of the two or more pieces of data and pastes on another piece of data, the relatedness calculator calculates relatedness between the one piece of data and the other piece of data based on a rate of a data amount of the copied and pasted data to a data amount of the one piece of data and/or a data amount of the other piece of data.

4. The data relatedness assessment device according to claim 1, wherein
the relatedness calculator calculates relatedness between one piece of data and another piece of data based on dwell time during which the line of sight position is dwelling within the display area of the one piece of data of the two or more pieces of data, and a data amount input by the worker to the other piece of data of the two or more pieces of data while the line of sight position is dwelling within the display area of the one piece of data.

5. The data relatedness assessment device according to claim 1, wherein
the relatedness calculator calculates mutual relatedness of two pieces of data included in the two or more pieces data by using a weighted average of:
relatedness of the two pieces of data that is calculated based on: dwell time during which the line of sight position is dwelling within respective display areas of the two pieces of data; time required for the line of sight position to move between the display areas of the two pieces of data; and a difference between the line of sight position before the line of sight position moves from the display area of one piece of data of the two pieces of data to the display area of the other piece of data thereof and the line of sight position after the line of sight position moves back from the display area of the other piece of data to the display area of the one piece of data;
relatedness of the two pieces of data that is calculated based on, when the worker copies from the one piece of data of the two pieces of data and pastes on the other piece of data thereof, a rate of a data amount of the copied and pasted data to a data amount of the one piece of data and/or a data amount of the other piece of data; and
relatedness of the two pieces of data that is calculated based on dwell time during which the line of sight position is dwelling within the display area of the one piece of data of the two pieces of data, and a data amount input by the worker to the other piece of data thereof while the line of sight position is dwelling within the display area of the one piece of data.

6. A data relatedness assessment method comprising the steps of:
acquiring information denoting respective display areas of two or more pieces of data displayed on a screen of a display device;
acquiring a line of sight position as a position of a line of sight of a worker on the screen of the display device;
generating gazing data information denoting the data that the worker is gazing at based on the line of sight position and the information denoting the display area;
acquiring operation information denoting a content of an operation that the worker has executed on the displayed data; and
a relatedness calculation calculating mutual relatedness of the two or more pieces of data in a task of the worker according to a predetermined rule based on the gazing data information and the operation information.

7. The data relatedness assessment method according to claim 6, wherein
the relatedness calculation step calculates mutual relatedness of two pieces of data based on: dwell time during which the line of sight position is dwelling within respective display areas of the two pieces of data included in the two or more pieces data; time required for the line of sight position to move between the display areas of the two pieces of data; and a difference between the line of sight position before the line of sight position moves from the display area of one piece of data of the two pieces of data to the display area of the other piece of data and the line of sight position after the line of sight position moves back from the display area of the other piece of data to the display area of the one piece of data.

8. The data relatedness assessment method according to claim 6, wherein
when the worker copies from one piece of data of the two or more pieces of data and pastes on another piece of data, the relatedness calculation step calculates relatedness between the one piece of data and the other piece of data based on a rate of a data amount of the copied and pasted data to a data amount of the one piece of data and/or a data amount of the other piece of data.

9. The data relatedness assessment method according to claim 6, wherein
the relatedness calculation step calculates relatedness between one piece of data and another piece of data based on dwell time during which the line of sight position is dwelling within the display area of the one piece of data of the two or more pieces of data, and a data amount input by the worker to the other piece of data of the two or more pieces of data while the line of sight position is dwelling within the display area of the one piece of data.

10. The data relatedness assessment method according to claim 6, wherein the relatedness calculation step calculates mutual relatedness of two pieces of data included in the two or more pieces data by using a weighted average of:

relatedness of the two pieces of data that is calculated based on: dwell time during which the line of sight position is dwelling within respective display areas of the two pieces of data; time required for the line of sight position to move between the display areas of the two pieces of data; and a difference between the line of sight position before the line of sight position moves from the display area of one piece of data of the two pieces of data to the display area of the other piece of data thereof and the line of sight position after the line of sight position moves back from the display area of the other piece of data to the display area of the one piece of data;

relatedness of the two pieces of data that is calculated based on, when the worker copies from the one piece of data of the two pieces of data and pastes on the other piece of data thereof, a rate of a data amount of the copied and pasted data to a data amount of the one piece of data and/or a data amount of the other piece of data; and relatedness of the two pieces of data that is calculated based on dwell time during which the line of sight position is dwelling within the display area of the one piece of data of the two pieces of data, and a data amount input by the worker to the other piece of data thereof while the line of sight position is dwelling within the display area of the one piece of data.

11. A computer-readable recording medium that stores a program for causing a computer to perform the steps of:

acquiring information denoting respective display areas of two or more pieces of data displayed on a screen of a display device;

acquiring a line of sight position as a position of a line of sight of a worker on the screen of the display device;

generating gazing data information denoting the data that the worker is gazing at based on the line of sight position and the information denoting the display area; acquiring operation information denoting a content of an operation that the worker has executed on the displayed data; and a relatedness calculation calculating mutual relatedness of the two or more pieces of data in a task of the worker according to a predetermined rule based on the gazing data information and the operation information.

* * * * *